(12) United States Patent
Potter

(10) Patent No.: US 6,349,609 B1
(45) Date of Patent: Feb. 26, 2002

(54) TWO-LEVER SHIFT MECHANISM FOR AN INTERNAL-LINKAGE TRANSFER CASE

(76) Inventor: Bradley Alston Potter, 1196 Raplee Ter., Fulton, CA (US) 95439

( * ) Notice: Subject to any disclaimer, the term of this patent is extended or adjusted under 35 U.S.C. 154(b) by 0 days.

(21) Appl. No.: 09/525,380

(22) Filed: Mar. 15, 2000

(51) Int. Cl.[7] .......................... B60K 23/08; F16H 59/10
(52) U.S. Cl. ................. 74/473.2; 74/473.19; 29/401.1; 180/247
(58) Field of Search ..................... 29/401.1; 180/247; 74/473.19, 473.2, 473.3, 745

(56) References Cited

U.S. PATENT DOCUMENTS

| | | | |
|---|---|---|---|
| 3,747,425 A | * | 7/1973 | MacDonald ............. 74/473.24 |
| 4,077,276 A | * | 3/1978 | Knox, Jr. ................. 74/473.21 |
| 4,356,879 A | * | 11/1982 | Uchiyama ................... 180/247 |
| 4,651,848 A | * | 3/1987 | Kobayashi et al. ......... 180/247 |

* cited by examiner

Primary Examiner—Allan D. Herrmann
(74) Attorney, Agent, or Firm—Risto A. Rinne, Jr.

(57) ABSTRACT

An apparatus and method for converting an internal-linkage type of a transfer case from single lever to dual lever control includes a sleeve that is adapted for placement into a housing of the transfer case. A pivot pin is disposed in the sleeve and defines a pivot axis. The pivot pin passes through a first pivot hole in a first arm and a second pivot hole in a second arm. The first arm includes a first arcuate end at one end thereof and the second arm includes a second arcuate end at one end thereof. The first and second arcuate ends are each adapted to cooperate with a member in the transfer case sufficient for the first arm to select either a two or a four wheel drive mode and for the second arm to select either a high or a low gear range when the first and second arms are pivoted about the axis. A first and a second shift lever are attached to the first and second arms and a protective boot covers at least a portion of the housing.

12 Claims, 4 Drawing Sheets

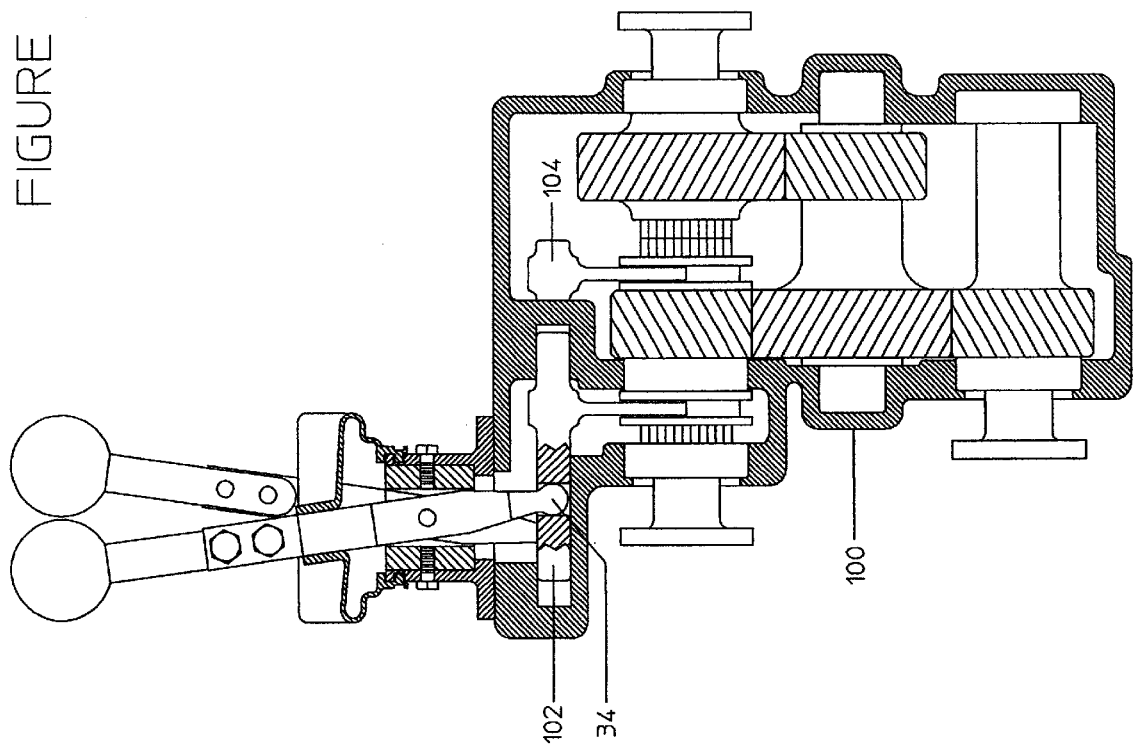
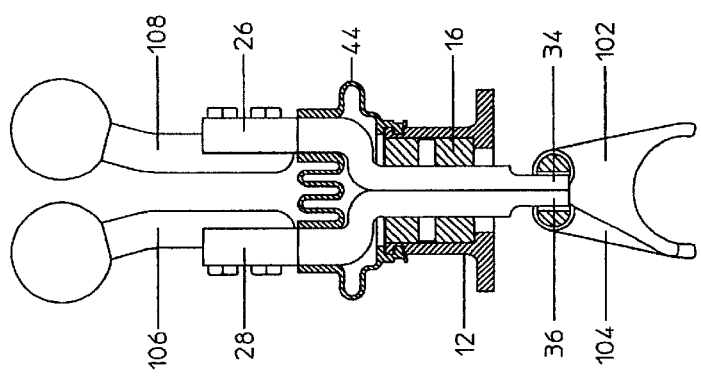

TWO-LEVER SHIFT MECHANISM FOR AN INTERNAL-LINKAGE TRANSFER CASE

BACKGROUND OF THE INVENTION

1. Field of the Invention:

The present invention, in general, relates to four wheel drive transfer case shift levers and, more particularly, to devices that convert a single lever transfer case shifter into a dual lever arrangement for internal-linkage types of transfer cases.

Factory equipped four wheel drive types of vehicles generally have a transfer case that is used to shift from either two-wheel drive mode (normal) to four-wheel drive mode (slippery roads). The transfer case also selects between a high and a low range of gears.

Usually, a single lever is supplied by the factory that is used to accomplish the gear changes from two-wheel drive into four-wheel drive and once in four-wheel drive from high gear range into low gear range.

For some people this arrangement is satisfactory even though it includes certain limitations. For others it is not.

For example, many drivers who regard their off-road vehicular use as a sport find a single lever to be too limiting. They would prefer to be able to select between two or four-wheel drive mode with one lever and then select the gear range with another lever.

While there are conversions that allow a driver to put a single lever shifter into a two-wheel drive low gear range, these positions have disadvantages and are discussed in greater detail hereinafter. It is important, however, to explain why a driver would want to put the transfer case into a two-wheel drive low gear range.

This position is useful when a driver is, for example, backing a boat trailer down a paved ramp into the water. A low gear range would allow the driver to "creep" backwards making course corrections at a safe and comfortable low rate of speed. However, if the driver were forced to go into four-wheel drive in order to achieve the low gear range, then as he made the steering corrections, binding of the gears would occur on the pavement. Clearly, this is not desirable.

Transfer cases come in two varieties that include external linkages and internal linkages. Conversion "kits" are known that can change an external linkage single lever transfer case into a dual lever transfer case for use with four-wheel drive vehicles.

This is fairly easy to achieve as the linkages are exposed outside of the transfer case. Therefore, it is possible to adapt a separate lever to readily engage with each of the linkages.

However, those vehicles that have an internal linkage four-wheel drive transfer case heretofore have been impossible to convert from a single lever into a dual lever arrangement. This is because there has been no way to access into the transfer case and then to separate the functions in such a way that would permit the use of two levers.

These types of internal linkage transfer cases are found on certain types of common imported vehicles, for example, with TOYOTA brand four wheel drive vehicles.

Presently, there is no known way to convert an internal-linkage 4WD transfer case from single lever to dual lever usage. That does not mean that it is impossible to get an internal transfer case having a single shift lever into two-wheel drive low gear range.

There are two basic ways to achieve getting an internal linkage transfer case into two-wheel drive low range. The first is by removal of a center detent ball from the transfer case. If this is accomplished, it may be possible to use the single shift lever to access two-wheel drive low gear, however it results in a complicated shift pattern and is therefore not desirable.

A second way includes the removal of the center detent ball and elongation of a shift arm slot in the shift fork shaft. When this type of a conversion is accomplished and the shift lever is in either the two-wheel drive low gear range or in the four-wheel drive high gear range, the shift lever is free to "flop" out of place. When this happens, even though the transfer case stays in the correct range and drive mode, the shift lever is prone to jamming when the driver attempts to shift into another setting.

Therefore, current modifications made to an internal-linkage transfer case so as to enable the use of a single shift lever to access a two-wheel drive low gear range have provided unsatisfactory results.

Accordingly there exists today a need for a device to convert an internal-linkage 4WD transfer case from single lever to dual lever use.

Clearly, such an apparatus would be a useful and desirable device.

2. Description of Prior Art:

Mechanisms and devices appertaining to transmissions and transfer cases are, in general, known. For example, the following patents describe various types of these devices:

U.S. Pat. No. 2,173,044 to Ruggles et al., Sep. 12, 1939;
U.S. Pat. No. 2,290,089 to Bock, Jul. 14, 1942;
U.S. Pat. No. 2,329,916 to Lamb et al., Sep. 21, 1943;
U.S. Pat. No. 4,281,735 to Sloma, Aug. 4, 1981;
U.S. Pat. No. 4,325,450 to Ward, Apr. 20, 1982;
U.S. Pat. No. 4,332,304 to Barnow, Jun. 1, 1982;
U.S. Pat. No. 4,646,584 to Okbo et al., Mar. 3, 1987;
U.S. Pat. No. 4,719,814 to Ida et al., Jan. 19, 1988;
U.S. Pat. No. 4,989,473 to McMorris, Feb. 5, 1991;
U.S. Pat. No. 5,954,612 to Baxter, Jr., Sep. 21, 1999; and
U.S. Pat. No. 6,000,296 to Sundquist, Dec. 14, 1999.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a two-lever shift mechanism for an internal-linkage transfer case that can adapt a single-lever internal-linkage transfer case for use with dual-levers.

It is also an important object of the invention to provide a two-lever shift mechanism for an internal-linkage transfer case that allows a four wheel drive vehicle having an internal-linkage transfer case to access a low gear range while it is in the two-wheel drive mode.

Another object of the invention is to provide a two-lever shift mechanism for an internal-linkage transfer case that can be modified to fit a variety of four-wheel drive vehicles that have an internal-linkage type of a transfer case.

Still another object of the invention is to provide a two-lever shift mechanism for an internal-linkage transfer case that has a positive "feel" and is reliable to use.

Still yet another object of the invention is to provide a two-lever shift mechanism for an internal-linkage transfer case that is easy to install.

Yet another important object of the invention is to provide a two-lever shift mechanism for an internal-linkage transfer case that includes a seal (i.e., a boot) to protect the interior of the transfer case from the elements, such as rain, mud, and snow.

Still yet another important object of the invention is to provide a two-lever shift mechanism for an internal-linkage transfer case that is inexpensive to manufacture.

Briefly, a two-lever shift mechanism for an internal-linkage transfer case apparatus for use with four-wheel drive vehicles that have an internal-linkage type of a transfer case which is constructed in accordance with the principles of the present invention has a sleeve that is adapted to fit into a housing. The housing is attached to the transfer case and it includes an opening providing access into the transfer case. The sleeve includes a pivot pin passing through opposing walls that define a pivot axis. A first and a second arm are disposed in the sleeve and are adapted to pivot about the axis. A first shift lever and a second shift lever are each attached to the first and second arms respectively at one end thereof. At an opposite end thereof the first and second shift levers extend into the interior portions of the vehicle so that an operator can control (i.e., shift) them independent of each other. The first shift lever selects two-wheel or four-wheel drive mode operation. The second shift lever selects the high or low gear range. A protective rubber boot fits over both the first and second shift arms and at least a portion of the housing.

BRIEF DESCRIPTION OF THE DRAWINGS

FIG. 3A is a front view of a portion of the assembled instant invention disposed in a transfer case.

FIG. 3B is a side view of the assembled instant invention as shown in FIG. 3A with added detail of the transfer case.

DETAILED DESCRIPTION OF THE INVENTION

Figure 1:
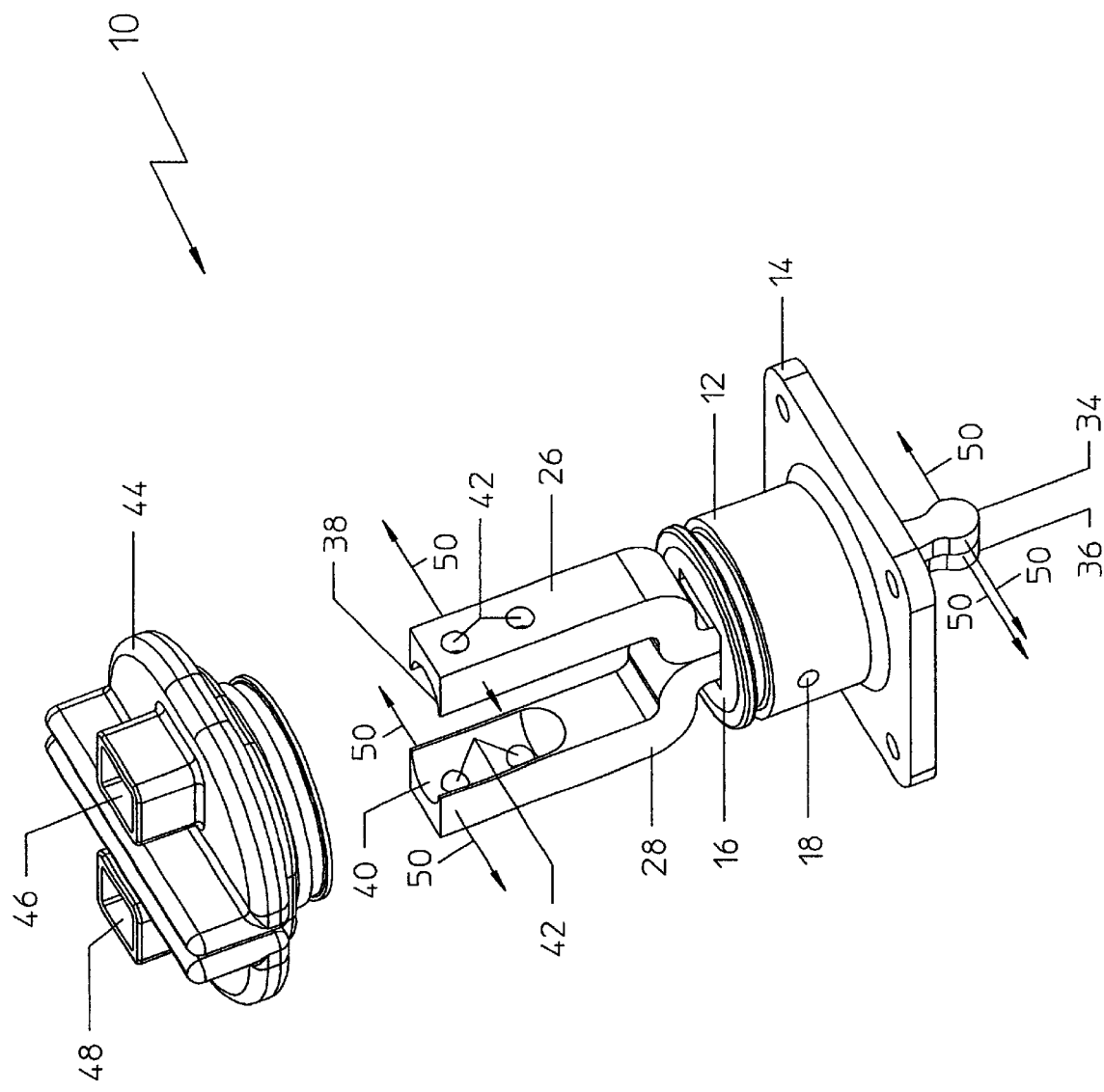
FIG. 1 is a view in perspective of a two-lever shift mechanism for an internal-linkage transfer case.

Referring now on occasion to all of the FIG. drawings is shown, a two-lever shift mechanism for an internal-linkage transfer case, identified in general by the reference numeral 10.

Figure 4B:
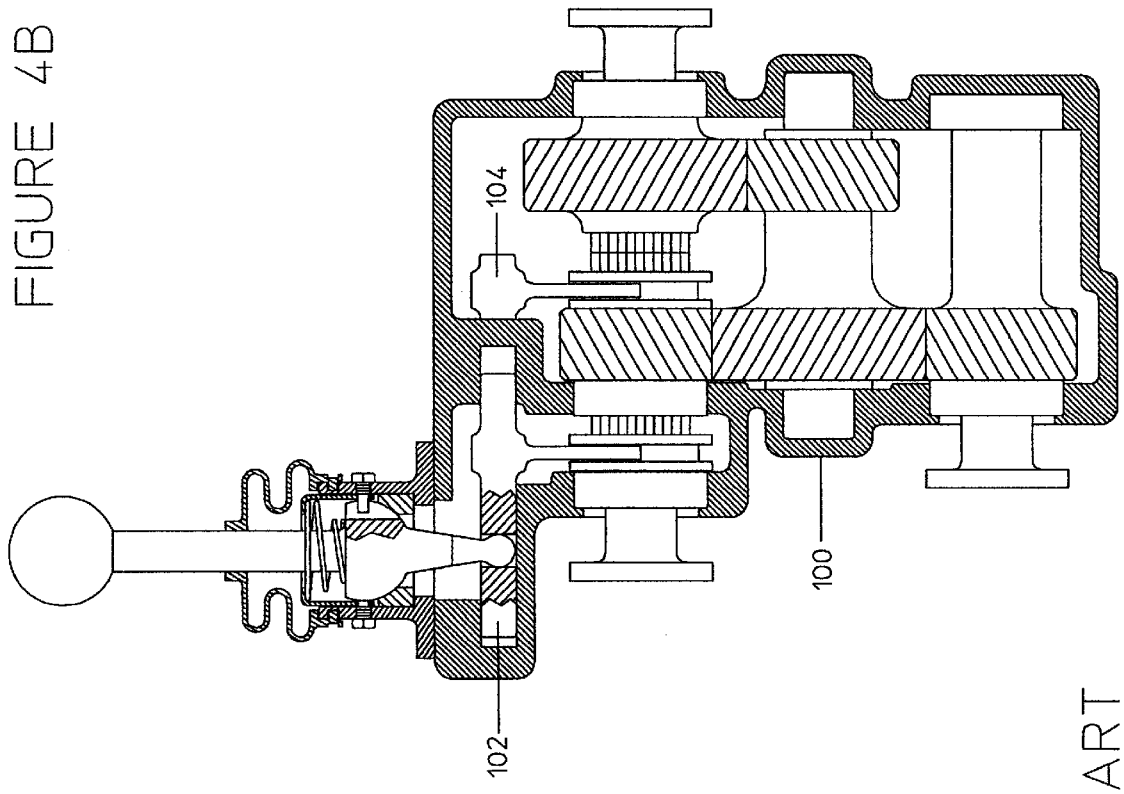
FIG. 4B is a side view of the Prior Art type of an internal-linkage transfer case as shown in FIG. 4A with added detail of the transfer case.
Figure 4A:
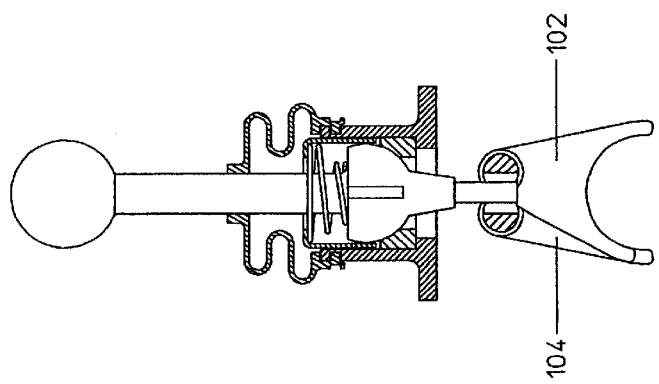
FIG. 4A is a front view of a Prior Art type of an internal-linkage transfer case with a single shift lever control.

A housing 12 is provided and described hereinafter. The housing 12 includes a base plate 14 attached thereto for connection (i.e., bolting) to an internal-linkage type of a transfer case (not shown). In order to do this, an existing single shift lever and its mounting plate (FIGS. 4A and 4B) are first unbolted and removed from the housing 12.

The housing 12 is original factory equipment that is normally used to contain the single shift lever. The single shift lever pivots about a point by using a ball and socket type of arrangement (4A and 4B) that is disposed within the housing 12. To accomplish the conversion to a dual shift lever the ball and socket must also be removed from the housing 12.

Accordingly, the original single shift lever that accompanied the vehicle was able to pivot forward and backwards and also simultaneously to pivot right and left thereby selecting either high or low range or two or four-wheel drive modes. However, detent pins or balls and limitations standard to such types of transfer cases precluded placing the transfer case in low range, two-wheel drive mode.

A sleeve 16 (also called a bushing) is provided that fits into the housing 12. For some types of internal-linkage transfer cases, the inside of the housing 12 must be bored or honed to remove imperfections from the casting process necessary to properly accept the sleeve 16 therein.

A pair of housing bore holes 18 are provided in the housing 12 through opposing walls. The housing bore holes 18 are supplied by the factory and are normally used to secure the ball and socket assembly of the original single lever. If according to the design of any particular modified type of a housing (not shown) they are absent, then the pair of housing bore holes 18 are drilled through opposing walls at a size and location that is specified according to instructions that are supplied or, preferably, they are supplied by the manufacturer.

When the sleeve 16 is inserted into the housing 12 a pair of screws or bolts (not shown) pass through each of the two housing bore holes 18 a short distance that is sufficient for them to thread into a pair of threaded sleeve holes 20 (only one is shown) that align with the housing bore holes 18 when the sleeve 16 is properly disposed and aligned in the housing 12.

A pivot pin 22 passes through an opposing pair of pivot pin holes 24 (only one shown) in opposing walls of the sleeve 16. The pivot pin 22 also passes through a first arm 26 and a second arm 28 through a first arm pivot hole 30 and a second arm pivot hole 32, respectively.

The pivot pin 22 defines an axis about which the first and second arms 26, 28 may pivot within the sleeve 16. The bottom portions of the first and second arms 26, 28 each include a first and second arcuate area 34, 36 respectively.

The first arcuate area 34 engages only that transfer case member 100 in the internal linkage transfer case that selects between two-wheel or four-wheel drive mode. That portion in the transfer case that the first arcuate area 34 engages is also referred to herein as a first member 102. The second arcuate area 36 engages only that remaining transfer case member that selects between high or low gear range. That portion in the transfer case that the second arcuate area 36 engages is also referred to herein as a second member 104. An appropriate neutral point may be disposed intermediate any of the modes (2 or 4WD or High or Low range) and may, of course, also be selected as the first and second arms 26, 28 are pivoted back and forth.

Any combination of high or low gear range in either two or four wheel drive can therefore be selected.

Each of the first and second arms 26, 28 also includes a recessed first and second mounting area, identified in general by the reference numerals 38, 40. The first and second mounting areas 38, 40 each include a pair of mounting holes 42.

The mounting holes 42 are adapted to receive a first shift lever 106 and a second shift lever 108. The first and second shift levers 106, 108 are designed to adapt to the particular vehicle and will extend appropriately into the interior of the vehicle, similar to that of the original single lever but in a side-by-side spaced apart orientation.

The exact size and shape of the first and second shift levers 106, 108 is dependent upon the needs and preferences of the user and the willingness of a manufacturer to meet those needs and preferences. Therefore, a great deal of flexibility is possible regarding their shape. It is also possible that the user will bend or otherwise modify either the first or the second shift levers 106, 108, or both, as desired.

The first and second shift levers 106, 108 are each attached to the first and second arms 26, 28 by a pair of screws or bolts that pass through the mounting holes 42 and attach by screw or bolt threads t o the first and second shift levers 106, 108 thereby securing the first and second shift levers 106, 108 to the first and second arms 26, 28.

Figure 2:
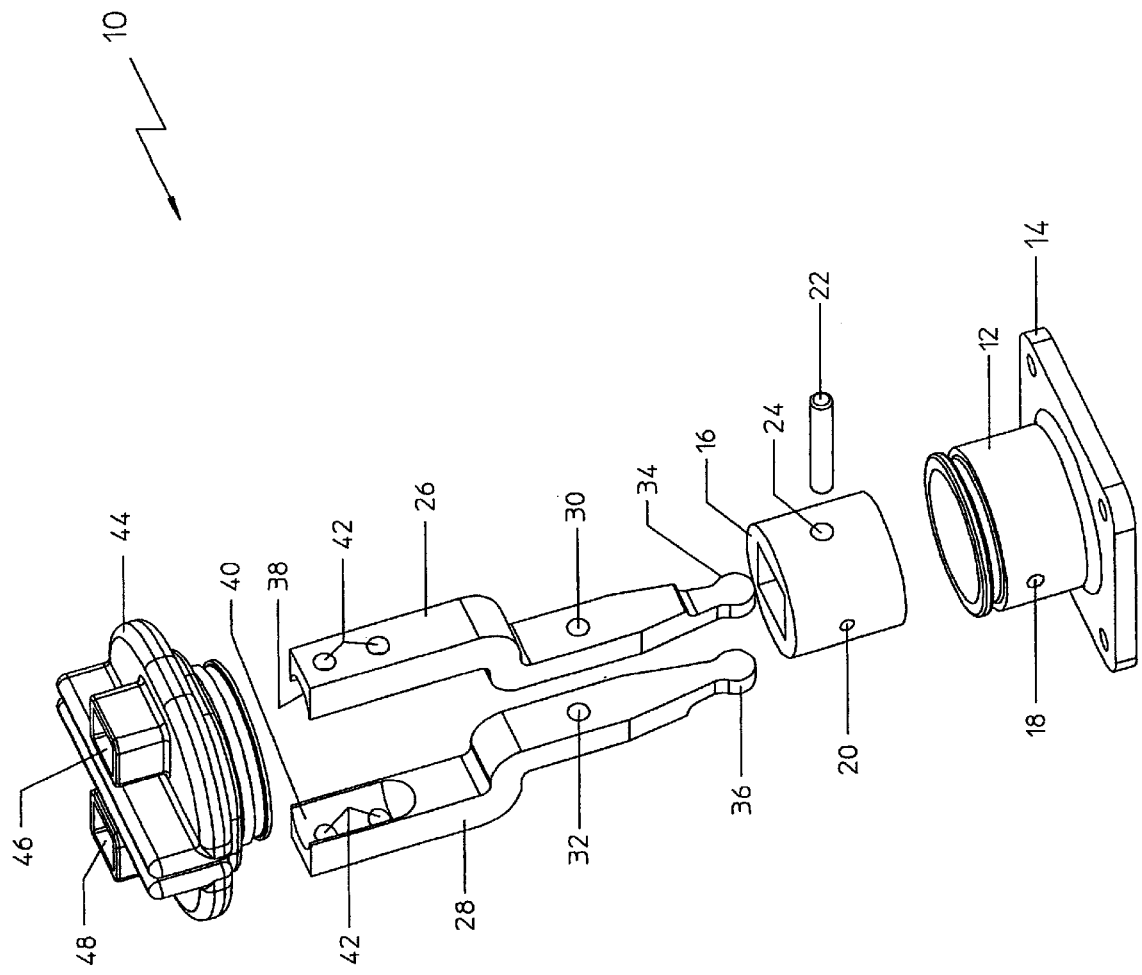
FIG. 2 is an exploded view of the internal-linkage transfer case two-lever shift mechanism of FIG. 1.

A protective boot 44 (shown in a detached position for clarity in both FIG. 1 and FIG. 2) and shown disposed over a portion of the housing 12 in FIG. 3 slips over the first and second arms 26, 28 and also over the sleeve 16 and top of the housing 12 sufficient to provide a weather-proof seal to protect the interior of the transfer case. The boot 44 is made of an elastomeric material, such as rubber or neoprene.

A pair of boot openings 46, 48 permit the first and second arms 26, 28 (with the first and second shift levers 106, 108 attached thereto) to extend through therefrom.

In operation, the user (i.e., an operator) inside the vehicle moves either the first or second shift lever 106, 108 (or both) independent with respect to the other to select either two or four wheel drive mode of high or low range, as desired. A positive "feel" is obtained because there is no side-to-side play coming from the first and second shift levers 106, 108 because they can each only pivot back and forth (not side-to-side). Reference arrows 50 show permitted motion.

The size of the sleeve 16 and first and second shift arms 26, 28 and the first and second shift levers 106, 108 and all component parts of the two-lever shift mechanism for an internal-linkage transfer case 10 are varied in size and shape as required to adapt to the particular transfer case and vehicle they are being used with. For example, either or both of the arms 26, 28 may be modified to include a greater or lesser offset, as desired.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is: What is claimed is:

1. A two-lever shift mechanism for use with an internal-linkage type of a transfer case, comprising:

(a) a sleeve that is adapted to fit into a housing of said transfer case; said housing including a pair of pivot pin bore holes disposed through opposite walls thereof;

(b) a first arm extending through said sleeve and including a first arcuate end at a bottom end thereof that is adapted to engage with a first member in said transfer case when said sleeve is disposed in said housing and select between a two and a four wheel drive mode, said first arm including a first arm pivot hole;

(c) a second arm extending through said sleeve and including a second arcuate end at a bottom end thereof that is adapted to engage with a second member in said transfer case when said sleeve is disposed in said housing and select between a high and a low gear range mode, said second arm including a second arm pivot hole; and (d) a pivot pin, each end thereof disposed in one of said pivot pin bore holes and wherein said pivot pin defines a pivot axis and wherein said pivot pin passes through said first arm pivot hole of said first arm and said second arm pivot hole of said second arm thereby securing said first arm and said second arm in said sleeve adjacent with respect to each other whereby said first arm and said second arm are adapted to pivot about said axis in said sleeve.

2. The two-lever shift mechanism of claim 1 wherein said first arm includes means for attaching a first shift lever thereto at an end opposite to said first arcuate end.

3. The lever shift mechanism of claim 1 wherein said second arm includes means for attaching a second shift lever thereto at an end opposite to said second arcuate end.

4. The two-lever shift mechanism of claim 1 wherein said sleeve includes means for securing said sleeve in said housing.

5. The two-lever shift mechanism of claim 1 including a boot disposed over at least a portion of said housing and said sleeve and said first and second arms.

6. The two-lever shift mechanism of claim 5 wherein said boot includes a pair of openings adapted to permit said first arm and said second arm to extend therefrom.

7. The two-lever shift mechanism of claim 5 wherein said boot is made of an elastomeric material.

8. The two-lever shift mechanism of claim 1 including a first shift lever, said first shift lever adapted for attachment to said first arm.

9. The two-lever shift mechanism of claim 1 including a second shift lever, said second shift lever adapted for attachment to said second arm.

10. A method for converting an internal-linkage type of a transfer case from a single shift lever control into a dual shift lever control, comprising:

providing a sleeve to fit into a housing of said transfer case and providing a pivot pin in said sleeve to define a pivot axis;

providing a first arm with a first pivot hole disposed over said pivot pin and adapted to pivot about said axis, said first arm including means for engaging with a first member of said transfer case sufficient to select either a two or a four wheel drive mode; and providing second arm with a second pivot hole disposed over said pivot pin and proximate to said first arm and adapted to pivot about said axis, said second arm including means for engaging with a second member of said transfer case sufficient to elect either a high or low gear range.

11. The method of claim 10 including the step of placing a protective boot over at least a portion of said housing.

12. The method of claim 10 including the step of boring out a portion of an interior of said housing sufficient to permit placing said sleeve therein.

\* \* \* \* \*